United States Patent
Hart, III

(10) Patent No.: US 7,376,653 B2
(45) Date of Patent: May 20, 2008

(54) CREATING DYNAMIC WEB PAGES AT A CLIENT BROWSER

(75) Inventor: James W. Hart, III, Perkiomenville, PA (US)

(73) Assignee: Reuters America, Inc., New York, NY (US)

(*) Notice: Subject to any disclaimer, the term of this patent is extended or adjusted under 35 U.S.C. 154(b) by 217 days.

(21) Appl. No.: 09/862,251

(22) Filed: May 22, 2001

(65) Prior Publication Data
US 2003/0009488 A1 Jan. 9, 2003

(51) Int. Cl.
*G06F 17/30* (2006.01)

(52) U.S. Cl. .................. 707/10; 707/101; 709/203; 717/115

(58) Field of Classification Search ............ 707/3–7, 707/10, 101, 102, 104.1; 709/203, 219; 717/115, 717/118
See application file for complete search history.

(56) References Cited

U.S. PATENT DOCUMENTS

| | | | |
|---|---|---|---|
| 5,956,709 A | 9/1999 | Xue | 707/3 |
| 6,043,815 A * | 3/2000 | Simonoff et al. | 345/744 |
| 6,297,819 B1 * | 10/2001 | Furst | 715/733 |
| 6,438,592 B1 * | 8/2002 | Killian | 709/224 |
| 6,480,883 B1 * | 11/2002 | Tsutsumitake | 709/203 |
| 6,546,397 B1 * | 4/2003 | Rempell | 707/102 |
| 6,578,025 B1 * | 6/2003 | Pollack et al. | 707/2 |
| 6,636,863 B1 * | 10/2003 | Friesen | 707/102 |
| 6,714,928 B1 * | 3/2004 | Calow | 707/4 |
| 6,721,748 B1 * | 4/2004 | Knight et al. | 707/10 |
| 6,728,716 B1 * | 4/2004 | Bhattacharya et al. | 707/10 |
| 6,816,880 B1 * | 11/2004 | Strandberg et al. | 709/202 |
| 2001/0044850 A1 * | 11/2001 | Raz et al. | 709/231 |
| 2002/0026474 A1 * | 2/2002 | Wang et al. | 709/203 |
| 2002/0107890 A1 * | 8/2002 | Gao et al. | 707/513 |
| 2002/0147735 A1 * | 10/2002 | Nir | 707/200 |

* cited by examiner

Primary Examiner—Leslie Wong
(74) Attorney, Agent, or Firm—Banner & Witcoff, Ltd.

(57) ABSTRACT

A system and method for accelerated downloading of dynamic web pages. Initially, customized script library functions are downloaded from the server to the client browser as part of the page frameset. A page request from a user is received by the client browser and transmitted to the server. In turn, page data is fetched by the server from remote data sources and formatted to include library code for invoking associated library functions written in a script programming language, e.g., JavaScript. The formatted data pages is transmitted from the server to the client browser which calls the library functions that were previously downloaded to the client browser in response to the library code in the data pages. The appropriate library functions are invoked from the client browser to generate Hyper-Text Markup Language code that is written to a target frame. Finally, the Hyper-Text Markup Language code written to the target frame is rendered. The downloaded JavaScript library functions are therefore downloaded to the client side only once but accessed multiple times thereby increasing efficiency of downloading and reducing bandwidth. Faster page draw is achieved because of the limited amount of information or data that is repeatedly transferred to the client browser from the server.

21 Claims, 8 Drawing Sheets

CREATING DYNAMIC WEB PAGES AT A CLIENT BROWSER

FIELD OF THE INVENTION

The present invention is directed to data delivery systems over a network and in particular, to accelerated downloading of dynamic web pages over the Internet using library functions.

DESCRIPTION OF RELATED ART

Internet browsing is implemented through client computers, HyperText Transfer Protocol (HTTP) server computers, and HTTP browsers. An Internet browser is software that resides on a client computer. When executed by a user, the browser opens a Uniform Resource Locator (URL) which resides on a server computer. Typically, the URL is a Hyper-Text Markup Language (HTML) page, which is transmitted from the server to the client computer. The HTML page has instructions for the browser, which instruct the browser how to render the page for display.

Java is a programming language developed by Sun Microsystem for creating animation and interactive web pages. Small portions of executable code, referred to as "applets" can be incorporated into HTML pages. Interactive web pages are typically created on the client side using a script language, such as JavaScript designed by Sun Microsystems and Netscape. JavaScript is an adjunct to the Java programming language. JavaScript code may be added to standard HTML pages to create interactive documents. Most modern web browsers contain JavaScript support. HTML pages may also contain links to subprograms such as Java applets.

HTML pages may be either static or dynamic. Static pages are fixed once so that the same page is transmitted every time it is accessed by the browser. On the other hand, dynamic pages, often referred to as virtual pages, are adaptively created by software residing on the server. In response to the client's request, the web page is generated on-the-fly by the software program residing on the server and then transmitted to the client. A dynamic page can differ each time it is sent to the client.

FIG. 1 is an exemplary flow chart of the conventional process for creating a dynamic page. Initially in step 100, a page request from the user is received by the browser (client side). The page request is transmitted in step 105 from the browser to the server. In step 110 data is fetched by the server from remote data sources. The server formats the page including the retrieved data in step 115. In step 120, the server then returns the response to the browser which renders the page for user viewing. Each time a page request is received by the browser from the user, the formatted page must be received from the server. This is extremely inefficient in terms of time, money and bandwidth.

Delivery of data over the Internet has become a very competitive industry. Research and development in this industry has focused on:

1) faster delivery to the end user;

2) reduced bandwidth requirements for the client;

3) reduced Internet bandwidth for the hosting environment; and 4) lower overall system costs.

It is therefore desirable to develop an improved system and method for creating dynamic web pages that shifts some of the work performed at the servers to the client's side.

SUMMARY OF THE INVENTION

The present invention is directed to a method for reducing the time to download dynamic web pages.

Another object of the present invention is to develop a system that reduces central processing unit (CPU) utilization on the server.

Still a further object of the present invention is to develop a system that reduces overall bandwidth of the hosting environment thereby reducing the size of the network and the size of the server farm required to support a predetermined number of users.

The system in accordance with the present invention reduces the work performed at the server by shifting it to the client's side. Faster page draw is achieved by limiting the amount of information or data that is repeatedly transferred to the client. Script library functions are downloaded once to the client computer. Downloaded data pages call the library functions to generate web pages in the client's browser. In a preferred embodiment, the library functions need not be installed by the user but instead may be downloaded as standard script. Library functions preferably exist in a cacheable page so that they need only be downloaded when changes are made. Page building complexity and processing load is redistributed from the sever to the client side where typically there is an abundance of CPU power and a shortage of bandwidth.

Yet another object of the present invention is to develop a process for creating dynamic web pages that reduces the overall bandwidth requirements thereby permitting the use of lower speed Internet connection requirements and reduce the cost of data delivery.

The present invention is directed to an accelerated method and system for downloading dynamic web pages by downloading library functions from the server to the client side in a page frameset. Thereafter, the library functions stored on the client side are called in response to code in the data pages downloaded to the client browser from the server.

In one embodiment, the invention relates to a method for accelerated downloading of dynamic web pages. Initially, customized script library functions are downloaded from the server to the client browser as part of the page frameset. A page request from a user is received by the client browser and transmitted to the server. In turn, page data is fetched by the server from remote data sources and formatted to include library code for invoking associated library functions written in a script programming language, e.g., JavaScript. The formatted data pages is transmitted from the server to the client browser which calls the library functions that were previously downloaded to the client browser in response to the library code in the data pages. The appropriate library functions are invoked from the client browser to generate Hyper-Text Markup Language code that is written to a target frame. Finally, the Hyper-Text Markup Language code written to the target frame is rendered. The downloaded JavaScript library functions are therefore downloaded to the client side only once but accessed multiple times thereby increasing efficiency of downloading and reducing bandwidth. Faster page draw is achieved because of the limited amount of information or data that is repeatedly transferred to the client browser from the server.

Another embodiment in accordance with the present invention is directed to a system for downloading dynamic web pages in response to a user's page request. The system includes a server electronically connected to a network for fetching data pages from remote data sources in response to the user's page request, formatting the data pages including library code for invoking associated library functions. A client browser is connected in electronic communication with the server through the network. The client browser receives downloaded customized script library functions downloaded once from the server to the client browser as part of a page frameset, calls the library functions previously downloaded to the client browser in response to the library code in formatted data pages from the server, invokes the library functions from the client browser to generate HTML code written to a target frame, and renders the HTML code written to the target frame.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

By way of example the present inventive process is being shown and described with respect to creating dynamic page requests using library formatting functions and code representing JavaScript, however, any other interactive script programming language may be used. An alternative script language is VBSCRIPT supported by the Internet Explorer browser by Microsoft.

Figure 3A:
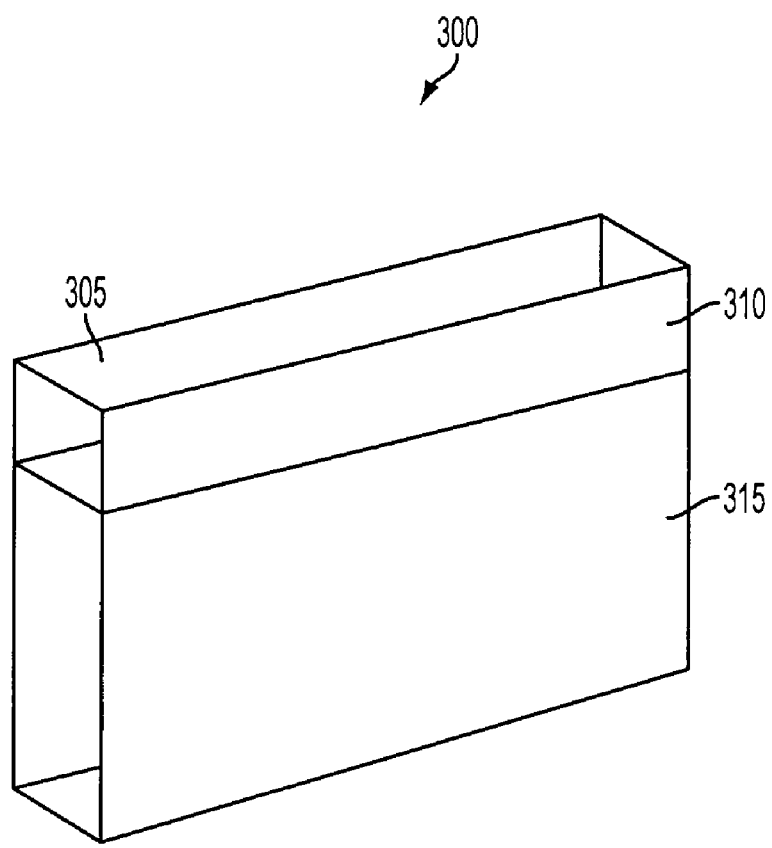
FIG. 3a is an exemplary schematic representation of the HTML page structure in accordance with the present invention.

An exemplary schematic representation of the HTML page structure 300 in accordance with the present invention is shown in FIG. 3a. The different pages are not drawn to scale. It is within the intended scope of the invention to construct web sites using alternative structures. The top.htm page 305 represents the frameset that defines the location and size of other pages, such as dyndata.htm page 310 and placeholder.htm page 315. In addition, the frameset contains library functions that are invoked from other pages.

The dyndata.htm page 310 represents the page of script code of a particular web page that is downloaded in response to the user's request. The size of the code for this page is significantly reduced compared with conventional pages because of the use of library code that invoke library functions from the top.htm page 305. No information or data is conveyed or displayed in this space to the user.

Lastly, placeholder.htm page 315 is the targeted page or frame in which the library calls that invoke the library functions generate the HTML code used to render the page to the user.

Figure 3B:
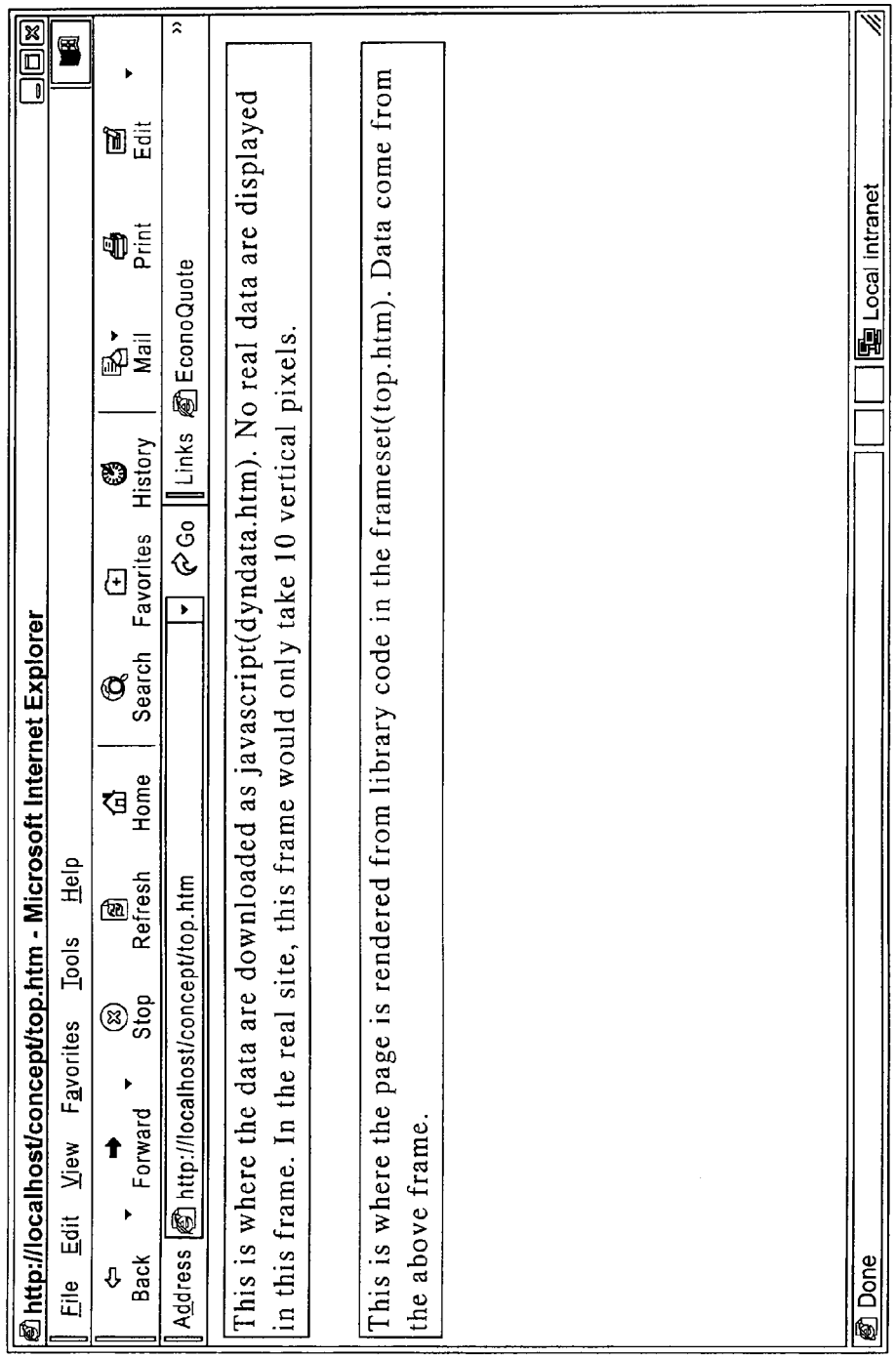
FIG. 3b is a screen shot of an exemplary web page render in accordance with the present invention.

A screen shot of an exemplary web page rendered in accordance with the present invention is shown in FIG. 3b. Below is the exemplary source code for the screen shown in FIG. 3b.

```
top.htm
<script language="JavaScript">
//begin javascript library code.
//Sample render page function.
function renderpage(data)
{
    //Open up the destination document
    Info.document.open( );
    //Write out the data in html format.
    Info.document.write(data);
    //Close the document, so it can be rendered.
    Info.document.close( );
}
//End of Javascript
</script>
<FRAMESET NAME="econoquote" ROWS="80,*" framespacing=0 frameborder="0" border=0>
    <FRAME name="dataframe" src="dyndata.htm" noresize
    marginheight=0
marginwidth=0 hscrolling=no vscrolling=yes>
    <FRAME name="info" src="placeholder.htm" noresize
    marginheight=0
marginwidth=0 hscrolling=no vscrolling=yes>
</FRAMESET>
placeholder.htm
<HTML>
<body bgcolor="#ffffff">
</body>
</HTML>
dyndata.htm
<HTML>
<BODY BGCOLOR="#ffffe2">
<script language="JavaScript">
<!--
document.write("<TABLEborder=2 width=\"100%\"><TR><TD>
This is where the data are downloaded as javascript(dyndata.htm).
No real data are displayed here. ");
document.write("In the real site, this frame would only take 10 vertical
pixels.</TR></TD></TABLE>");
//This is the javascript, which calls the library code, and causes the
page to be rendered.
parent.renderpage("<BODY bgcolor=lightblue><TABLE border=2
width=\"100%\"><TR><TDThis is where the page is rendered from
the library code in the frameset(top.htm). Data comes from the above
frame.</TR></TD></BODY>");
//-->
</script>
</BODY>
</HTML>
```

Figure 1:
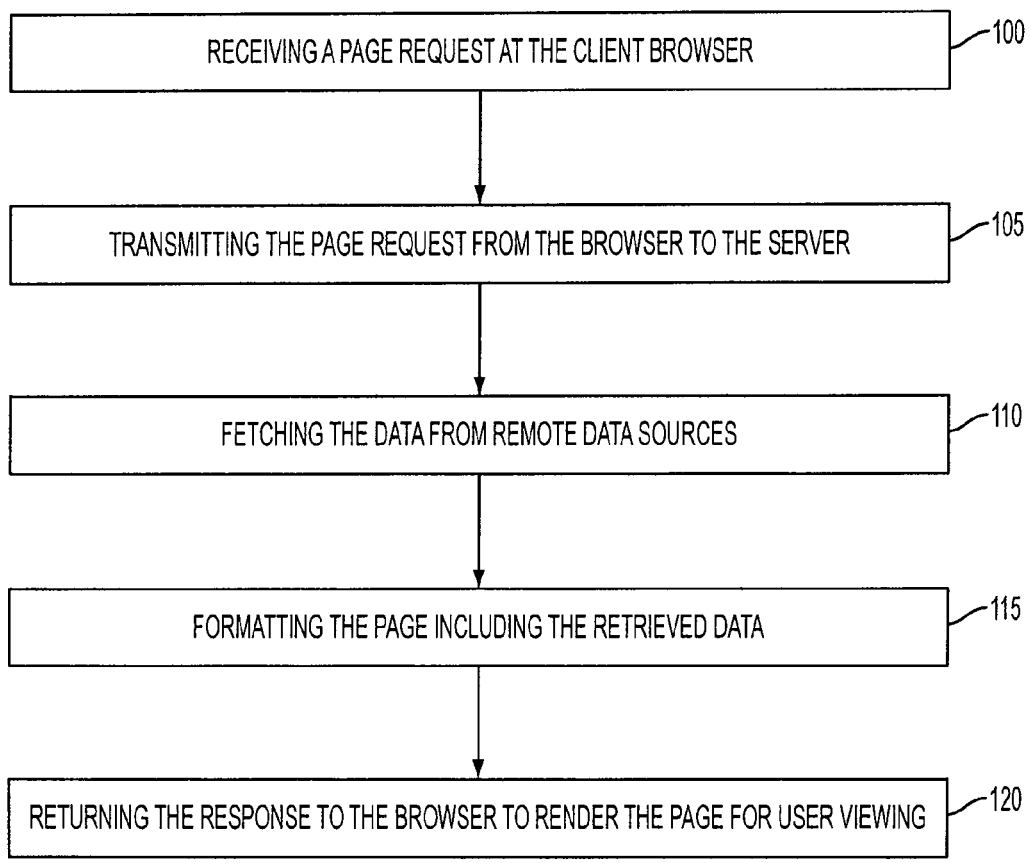
FIG. 1 is an exemplary flow chart of a prior art process for creating a dynamic page.
Figure 2:
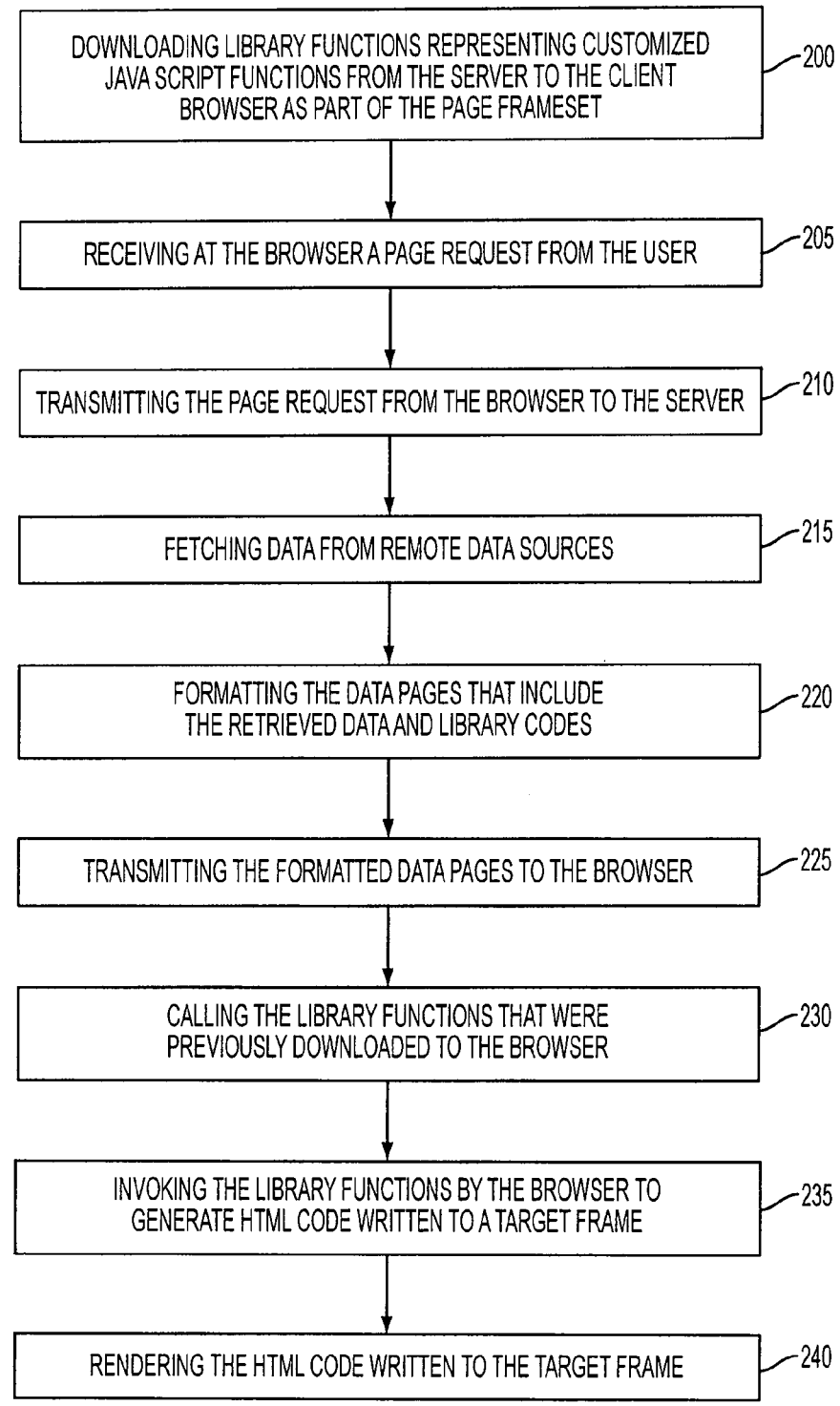
FIG. 2 is an exemplary flow chart of the process for creating a dynamic page in accordance with the present invention.

FIG. 2 is an exemplary flow chart of the process for creating a dynamic web page in accordance with the present invention. Initially in step 200, library formatting function, for example, customized Java Script formatting functions, to be repetitively revoked are downloaded according to instructions stored in a computer readable medium either at the server or the client computer one time altogether from the server to the client browser as part of the page frameset. Accordingly, the formatting code is downloaded only once and invoked multiple times. A page request from the user is received by the browser (client side) and transmitted in steps 205-210 from the browser to the server. In step 215 data is fetched by the server from remote data sources. The server in step 220 formats data pages that include the retrieved data and library formatting code. In step 225, the server then transmits the formatted data pages to the browser. The browser, in turn, parses out and invokes the library code in step 230 calling the library functions that were previously downloaded to the browser. Thus, the script code for the library functions need only be transferred to the client side once. In step 235, the library functions invoked by the browser generate HTML code that is written to a target frame (placholder.htm.). The browser, in step 240, renders the HTML code that was written to the target frame (for user viewing). In a preferred embodiment, the library function need not be installed by the user, but instead may be downloaded as standard JavaScript.

Sorting and/or Filtering of Data

Many web sites allow the user to sort and/or filter data based on predetermined criteria, for example, alphabetically or numerically. Conventional web sites typically achieve this functionality by gathering the data from a database that has been pre-sorted or pre-filtered. Alternatively, data may be sorted or filtered on the server prior to rendering the page. These conventional techniques are expensive when the user wants to re-sort or re-filter a previously sorted or filtered data set. Sorting and filtering requires a re-request of the page from the server, re-fetching the data from the database, and delays associated with each step.

Figure 4:
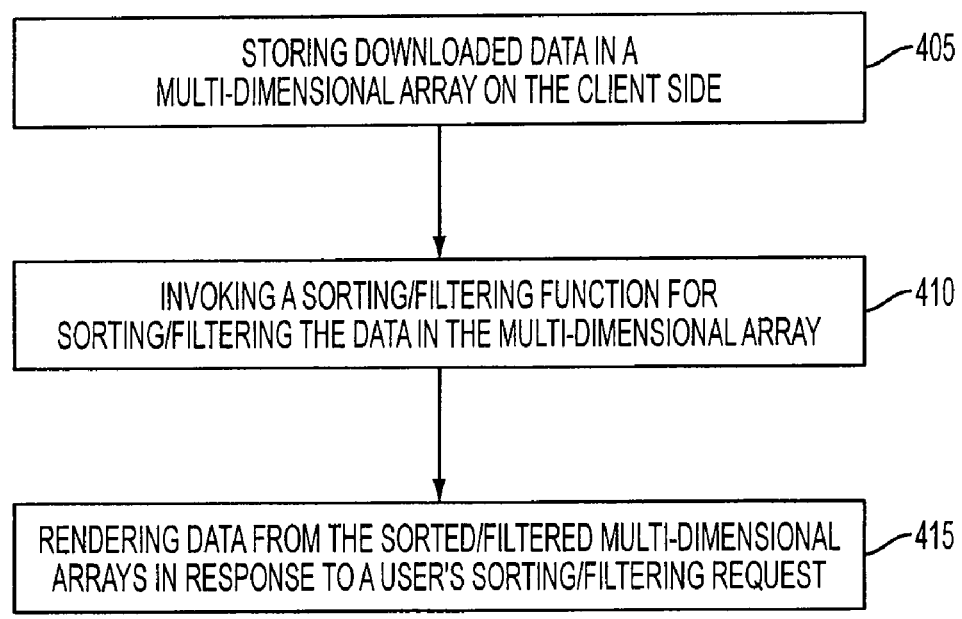
FIG. 4 is an exemplary flow chart of the process for sorting/filtering data in accordance with the present invention.

FIG. 4 is an exemplary flow chart of the process for sorting/filtering data in accordance with the present invention. In step 405 the library functions in accordance with the present invention can be used to store the downloaded data in multi-dimensional arrays on the client side. Implement a sorting function for sorting the multi-dimensional array in step 410. Thereafter, in step 415, data in response to the user's sort request is rendered from the sorted arrays thereby eliminating the need to obtain additional downloads from the server to the client's side for the user to sort.

View Full Details

The user may view the full details without additional server requests for the transaction detail data. The data download size is reduced so much that all data may be downloaded for each transaction. The data are then stored in multi-dimensional arrays on the client side and used to render records on a page in response to the user's request without additional or repeated downloads from the server.

Because the web page is downloaded more quickly the user's experience is significantly improved. As a result, more users will be attracted to obtain information from a web site that implements the technology in accordance with the present invention. The advantages associated with the system in accordance with the present invention are greatest when generating HTML pages that are verbose and wherein the content is represented in table form with a significant amount of repetitive code. In particular, the technology is well suited to dynamic data sites where rows of records are downloaded to the end user, such as a web site where the primary function is to return data from a database and display multiple records to the user. Some typical web sites in which repetitive data is displayed are search engines, brokerage sites, database lookup sites, message board sites. Such web sites have complex repetitive formatting that benefit by the technology in accordance with the present invention in which formatting is downloaded only once but reused or called many times. Other types of web pages, for example, those containing a large graphics content will not benefit as much by the technology in accordance with the present invention.

Figure 5A:
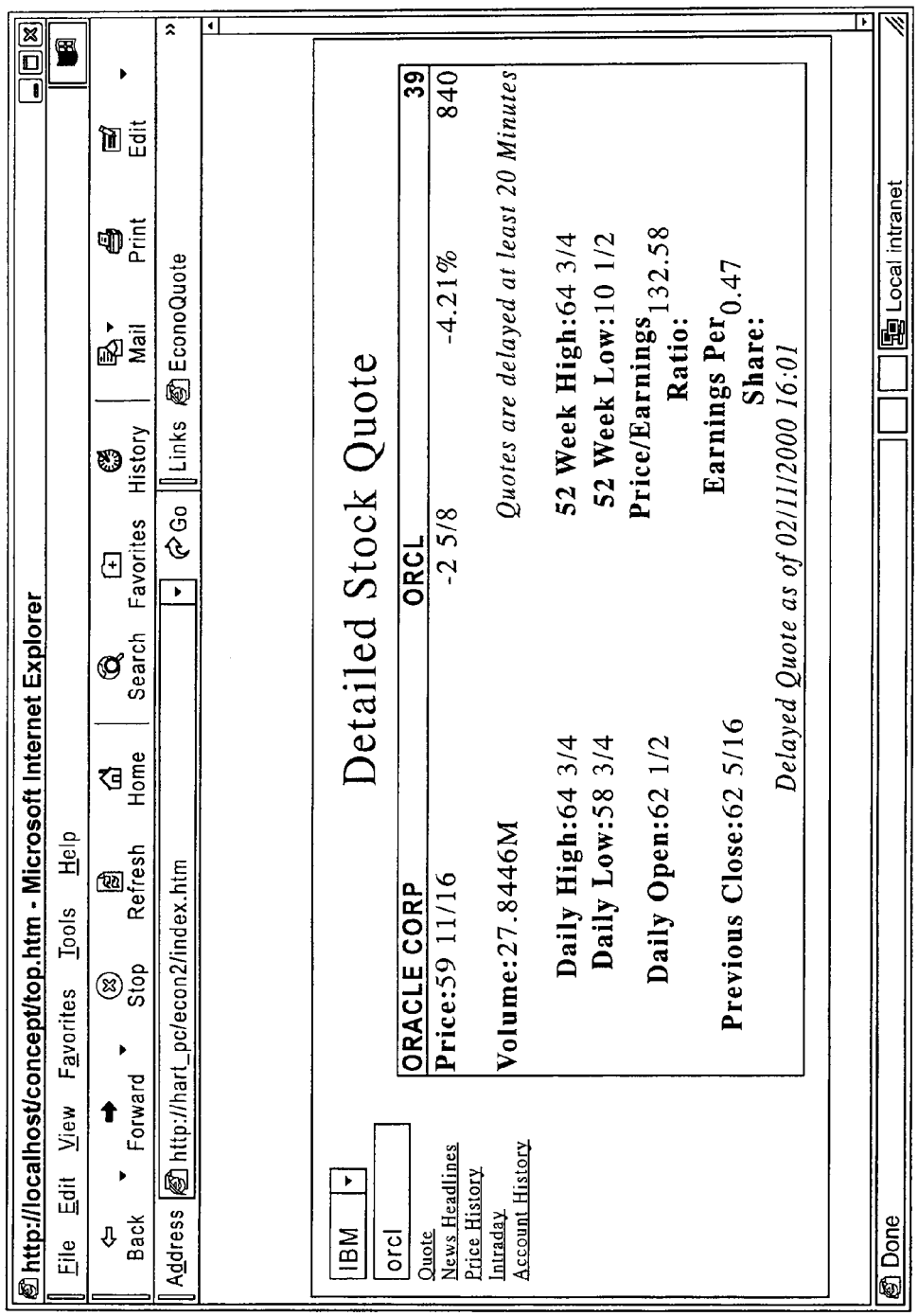
FIGS. 5a-5c represent illustrative examples of financial web pages that were generated in accordance with the present invention.
Figure 5B:
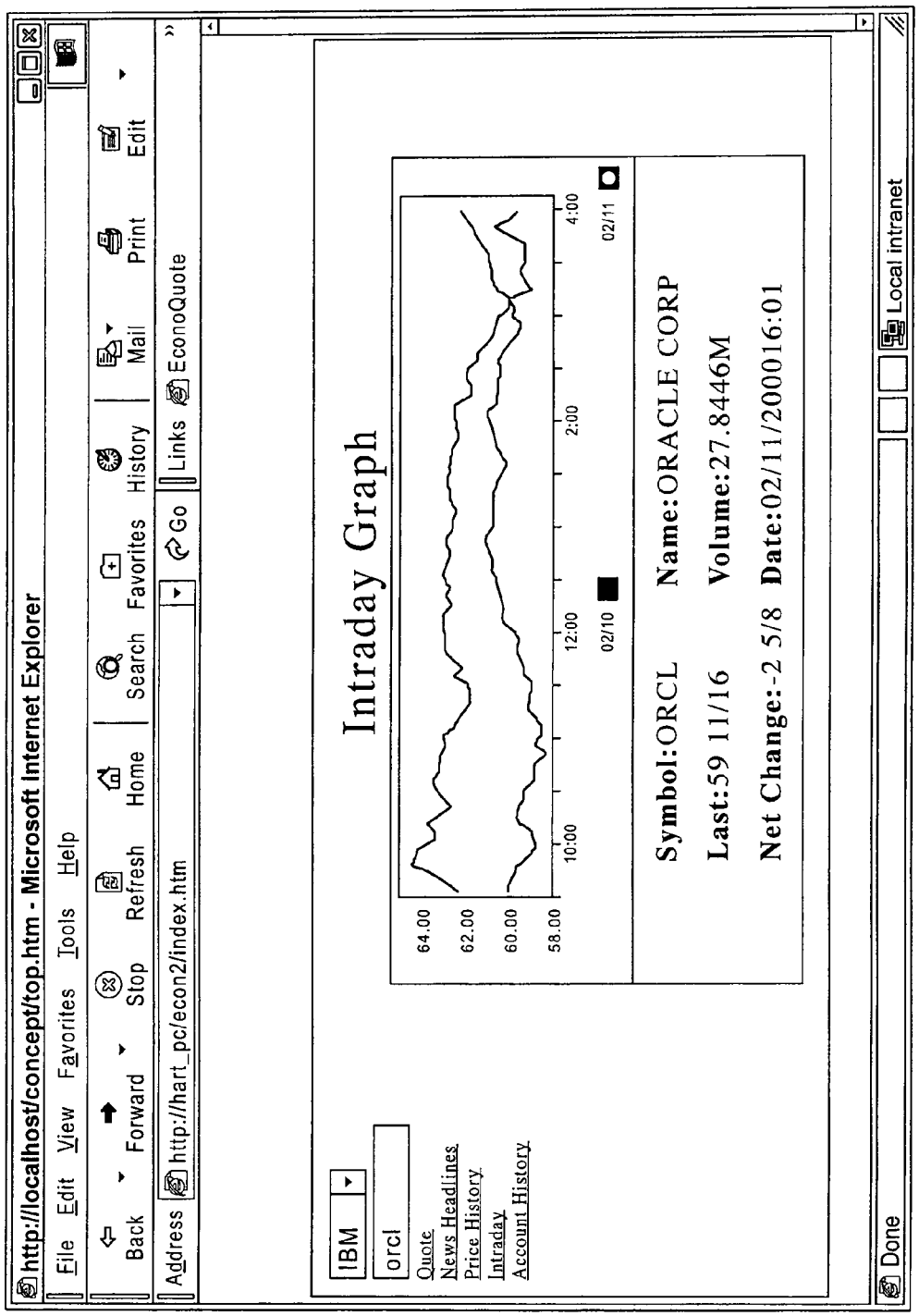
Figure 5C:
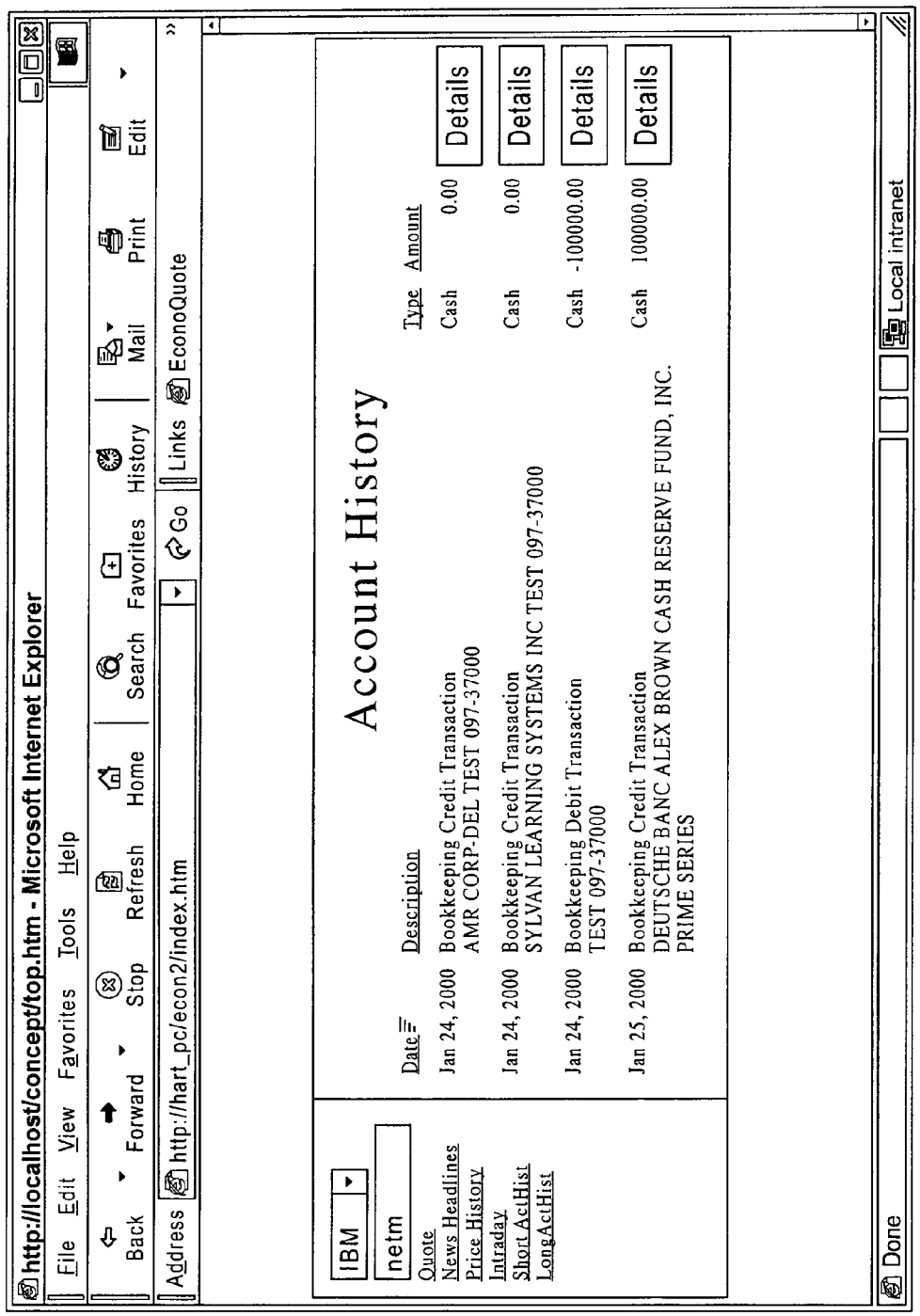

The system and process described above in accordance with the present invention is particularly useful in displaying financial data which generally changes over time but is set forth in a conventional format. In particular, the system and process is well suited for display of such financial data as quotes, news headlines, news stories, price history, and intraday graphs. FIGS. 5a-5c represent illustrative examples of financial web pages that were generated in accordance with the present invention. The present technology is not limited to dynamic data financial web sites, but can be applied to any other type of dynamic web site.

The source code used to generate the exemplary Detailed Quote Page screen shown in FIG. 5a is provided below.

```
<HTML>
<BODY BGCOLOR=ffffe2>
<script language="JavaScript">
<!--
parent.renhdr("Detailed Stock Quote");
parent.renqte("NETMANAGE INC","NETM","NASDAQ National
Market System","1.25",'U',"+0.09375","8.11","US
DOLLAR","290600","1.28125","1.1875","5.0625",0.84375,"1.21875",
"0","1.
15625","−0.66","10/26/98 15:57");
parent.renft("netm","q");
//-->
</script>
</BODY>
</HTML>
```

The source code opens HTML, body, and Script tag which defines the start of the JavaScript code. A call invokes to the library function renhdr() that generates the navigation and title on the data section of the page. Next, a call invokes the library function renqte() to generate the actual HTML code for the data portion of the page. Each different page type has its own customized library function for page generation. Lastly, a call to library function renft() generates the page footer, closes the page, and causes the page to be rendered.

The source code used to generate the exemplary Intraday Graph screen shown in FIG. 5b is provided below.

```
<HTML>
<BODY BGCOLOR=ffffe2>
<script language="JavaScript">
<!--
parent.renhdr("Intraday");
parent.renqte("NETMANAGE INC","ORCL","NASDAQ National
Market
System","1.25",'U',"+0.09375","8.11","US
DOLLAR","290600","1.28125","1.1875","5.0625",0.84375,"1.21875",
"0","1.
15625","−0.66","10/26/98 15:57");
parent.renft("ORCL","i");
//->
</script>
</BODY>
</HTML>
```

Since the same data is used for the Intraday Graph as that for the Detailed Quote Page the source code is similar. The only difference is in the particular page generation code invoked.

The source code used to generate the exemplary Account History screen shown in FIG. 5c is provided below.

```
<HTML>
<BODY BGCOLOR=ffffe2>
<script language="JavaScript">
<!--
parent.renhdr("Account History");
parent.setdatarow("AT&T CORP CASH DIV ON 300 SHS REC 12/31/99
PAY 0  2  /  0  1  /  0  0  "  ,  "  N  /  A  "  ,  "
```

-continued

```
F e b    0  1  , 2000","Dividend/Interest","Buy","20000201",",",",
09999999934.00","1000000000000.00000","0.00000","DIV","DIV","0",
"N/A","N/A","AT&T CORP","-66.00","N/A");
o
o    n rows of data
o
parent.setdatarow("INTEREST ON CREDIT BALANCE FROM 11/29
THRU 12/28 @4.632% BAL2215,441 ABAL 2215,400 INTEREST PAID
FOR 30 D  A  Y  (  S  )  "  ,  "  N  /  A  "  ,  "
D  e  c    2  9  , 1999","Cash","Buy","19991229",",",
"0999991446.89","1000000000000.00000","0.00000","INT","INT",
"0","INT","N/A","N/A","INTEREST CREDIT BALANCE",
"-8553.11","N/A");
parent.renft("netm","q");
//-->
</script>
</BODY>
</HTML>
```

The page generation code for the Account History screen is an example of implementing caching and sorting of the data used to render the page. Data caching is implemented using JavaScript arrays to store the data that is downloaded for the page. Thus, the page may be re-rendered from the stored data in the arrays without re-requesting the data from the server.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A method comprising:
    downloading customized script library functions from a server at a client browser as part of a first data page;
    receiving at the client browser a page request from a user;
    transmitting the page request from the client browser to the server;
    receiving a formatted second data page at the client browser transmitted from the server, the second data page including library code configured to invoke associated library functions and data fetched from remote data sources;
    storing the data fetched from remote data sources in a multi-dimensional array at the client browser;
    in response to the library code in the second data page, automatically calling the library functions that were previously downloaded to the client browser as part of the first data page to generate Hyper-Text Markup Language code written to a target frame; and
    rendering the Hyper-Text Markup Language code written to the target frame including rendering data from the multi-dimensional array.

2. The method in accordance with claim 1, wherein for the step of downloading, the script library functions are written in a script program language.

3. The method in accordance with claim 2, wherein the script program language is JavaScript.

4. The method in accordance with claim 1, further comprising invoking at the client browser a filtering function configured to filter the data in the multi-dimensional array, wherein the step of rendering includes rendering filtered data from the multi-dimensional array.

5. The method of claim 1, further comprising invoking at the client browser a sorting function configured to sort the data in the multi-dimensional array, wherein the step of rendering includes rendering sorted data from the stored multi-dimensional array.

6. The method of claim 1, wherein the first data page comprises a frameset.

7. A system comprising:
    a network;
    a server electronically connected to the network configured to fetch data pages from remote data sources in response to the user's page request and to format the data pages to include library code configured to invoke associated library functions; and
    a client browser in electronic communication with the server through the network configured to perform steps comprising:
        receiving downloaded customized script library functions downloaded once from the server to the client browser as part of a first data page;
        automatically calling the library functions previously downloaded in the first data page in response to the library code in a second data page from the server to generate HTML code written to a target frame;
        storing data fetched from remote data sources in a multi-dimensional array;
        rendering the HTML code written to the target frame including rendering data from the multi-dimensional array.

8. The system in accordance with claim 7, wherein the network is one of the Internet, World Wide Web, Local Area Network, Wide Area Network, and Intranet.

9. The system in accordance with claim 7, wherein the library functions are in a script programming language.

10. The system in accordance with claim 9, wherein the script programming language is JavaScript.

11. The system of claim 7, wherein the first data page comprises a frameset.

12. The system of claim 7, wherein the client browser is further configured to invoke a sorting function, which is configured to sort the data in the multi-dimensional array, and the step of rendering includes rendering sorted data from the multi-dimensional array.

13. The system of claim 7, wherein the client browser is further configured to invoke a filtering function, which is configured to filter the data in the multi-dimensional array, and the step of rendering includes rendering filtered data from the multi-dimensional array.

14. A method comprising:
    transmitting customized script library functions to a client browser from a server as part of a first data page;
    receiving a user page request from the client browser;
    fetching data from remote data sources;
    formatting a second data page to include library code configured to automatically invoke associated library functions previously transmitted to the client browser as part of the first data page and to instruct the client browser to generate Hyper-Text Markup Language code for a target frame in response to the library code and to further include the data fetched from remote data sources arranged in a multi-dimensional array; and transmitting the formatted second data page to the client browser.

15. The method of claim 14, wherein for the step of transmitting customized library script functions, the script library functions are written in a script program language.

16. The method of claim 15, wherein the script program is JavaScript.

17. The method of claim 14, wherein the first data page comprises a frameset.

18. A computer readable medium storing computer executable instructions configured to instruct a computer to perform the steps of:

downloading customized script library, functions from a server at a client browser as part of a first data page;
  receiving at the client browser a page request from a user;
  transmitting the page request from the client browser to the server;
  receiving a formatted second data page at the client browser transmitted from the server, the second data page including library code configured to invoke associated library functions and data fetched from remote data servers;
  storing the data fetched from remote data servers in a multi-dimensional array at the client browser;
  in response to the library code in the second data page, automatically calling the library functions that were previously downloaded to the client browser as part of the first data page to generate Hyper-Text Markup Language code written to a target frame; and
  rendering the Hyper-Text Markup Language code written to the target frame including rendering data from the multi-dimensional array.

19. A computer readable medium storing computer executable instructions configured to instruct a computer to perform the steps of:

downloading customized script library functions from a server at a client browser as part of a first data page;
  receiving at the client browser a page request from a user;
  transmitting the page request from the client browser to the server;
  receiving a formatted second data page at the client browser transmitted from the server, the second data page including library code configured to invoke associated library functions and data fetched from remote data servers;
  in response to the library code in the second data page, automatically calling the library functions that were previously downloaded to the client browser as part of the first data page to generate Hyper-Text Markup Language code written to a target frame;
  rendering the Hyper-Text Markup Language code written to the target frame;
  downloading customized script library functions from a server at a client browser as part of a first data page;
  storing the downloaded page data in a multi-dimensional array in the client browser;
  receiving at the client browser a sort request from a user;
  invoking at the client browser a sorting function configured to sort the data in the multi-dimensional array in response to the sort request from the user; and
  rendering data from the sorted multi-dimensional array in response to the sort request from the user.

20. A computer readable medium storing computer executable instructions configured to instruct a computer to perform the steps of:

downloading customized script library functions from a server at a client browser as part of a first data page;
  receiving at the client browser a page request from a user;
  transmitting the page request from the client browser to the server;
  receiving a formatted second data page at the client browser transmitted from the server, the second data page including library code configured to invoke associated library functions and data fetched from remote data servers;
  in response to the library code in the second data page, automatically calling the library functions that were previously downloaded to the client browser as part of the first data page to generate Hyper-Text Markup Language code written to a target frame;
  rendering the Hyper-Text Markup Language code written to the target frame;
  downloading customized script library functions from a server at a client browser as part of a first data page;
  storing the downloaded page data in a multi-dimensional array in the client browser;
  receiving at the client browser a filter request from a user;
  invoking at the client browser a filtering function configured to filter the data in the multi-dimensional array in response to the filter request from the user; and
  rendering data from the filtered multi-dimensional array in response to the filter request from the user.

21. A computer readable medium storing computer executable instructions configured to instruct a computer to perform the steps of:

transmitting customized script library functions to a client browser from a server as part of a first data page;
  receiving a user page request from the client browser;
  fetching data from remote data sources;
  formatting a second data page to include library code configured to automatically invoke associated library functions previously transmitted to the client browser as part of a first data page and to instruct the client browser to generate Hyper-Text Markup Language code for a target frame in response to the library code and to further include the data fetched from remote data sources arranged in a multi-dimensional array; and
  transmitting the formatted second data page to the client browser.

* * * * *